Aug. 16, 1955     E. M. KALTENBACH     2,715,269
CROP GATHERING SHEARS
Filed May 22, 1953
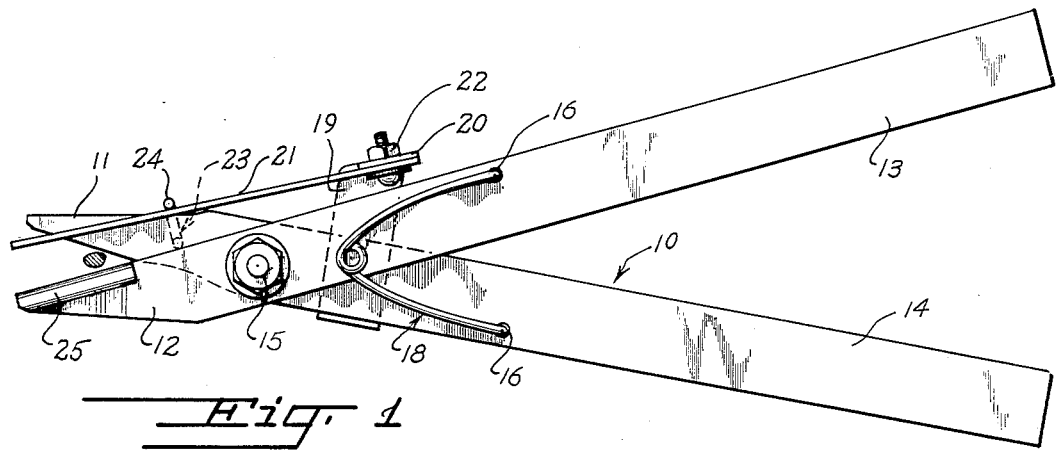
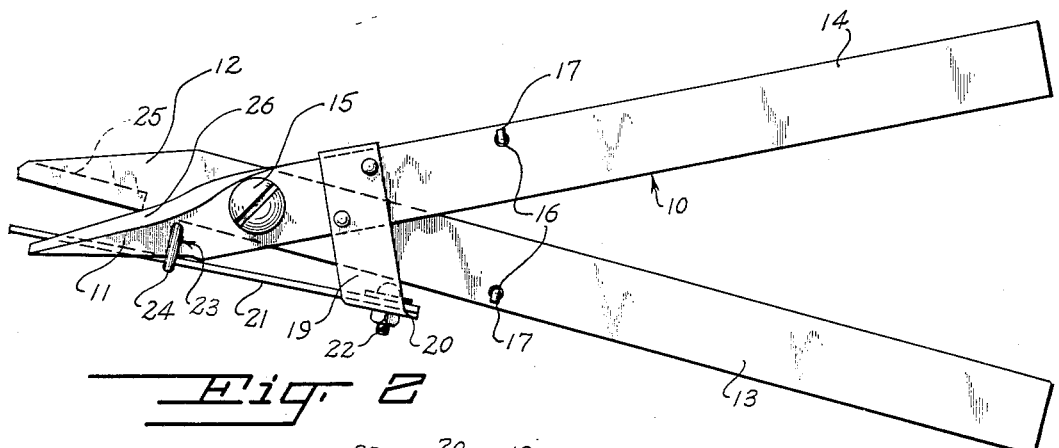
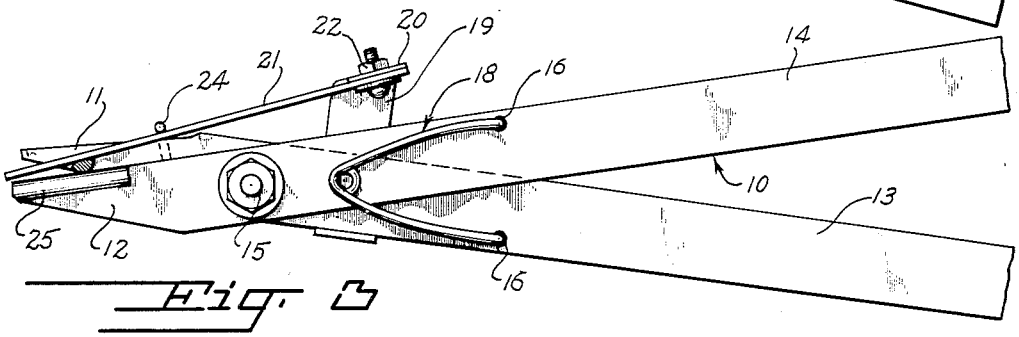
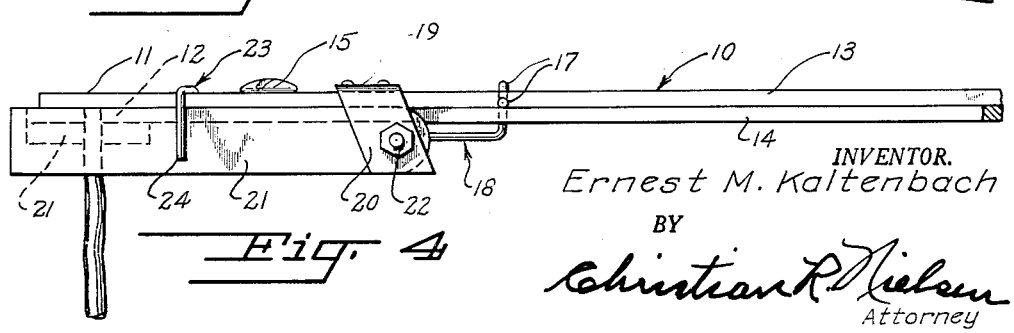
INVENTOR.
Ernest M. Kaltenbach
BY
Christian R. Nielsen
Attorney

United States Patent Office 2,715,269
Patented Aug. 16, 1955

2,715,269

CROP GATHERING SHEARS

Ernest M. Kaltenbach, Yucaipa, Calif.

Application May 22, 1953, Serial No. 356,703

1 Claim. (Cl. 30—135)

This invention relates to crop gathering shears and it consists in the constructions, arrangements and combinations herein described and claimed.

It is the cardinal object of the invention to provide shears wherein cutting blades sever the same or stalk of the crop to be gathered, and in which means are provided for gripping the stem or stalk upon complete severance thereof, so that the crop thus gathered may be deposited in a suitable receptacle or otherwise disposed of.

More specifically, it is an object of the invention to provide shears wherein the blades are pivotally connected and spring tensioned so as to normally maintain the blades in open position, one of said blades having an abutment at right angles to the cutting edge cooperating with a resilient stem or stalk gripping member on the other blade when the blades are moved to closed or cutting position, the abutment and gripping member thus serving to firmly grip the severed stem or stalk.

Additional objects, advantages and features of invention will be apparent from the following description, considered in conjunction with the accompanying drawing, wherein Figure 1 is a side elevation of the shears as constructed in accordance with the invention, Figure 2 is a similar view illustrating the opposite side of the shears, Figure 3 is a view similar to Figure 1, but illustrating the shears operative position after severance of a stem or stalk, and Figure 4 is a top plan view of Figure 3.

There is illustrated a crop gathering shears generally indicated by the reference character 10 comprising a pair of cutting blades 11 and 12, the blade 11 having a handle 13 and the blade 12 is provided with a handle 14. The handles are arranged in crossed relation presenting the cutting edges of the blades in opposed relation and pivotally connected by means of a suitable bolt and nut 15. Each of the handles 13 and 14 are provided with an aperture 16 into which respective ends 17 of a bow spring 18 are inserted and secured in any approved manner. The spring 18 is so located and of such strength as to maintain the blades 11 and 12 in open position.

The blade 11 is provided with a bracket 19 secured to the outer side thereof rearwardly of the pivot bolt 15 and at substantially right angles to the blade 11. The bracket 19 includes a lateral extension 20 overlying and extending beyond the handles 13 and 14, the extension 20 functioning to mount a resilient stalk or stem gripping member 21, in the present instance, the mounting means being shown as a bolt and nut assembly 22. The gripping means 21 is a flat steel strap of a width to extend beyond the outer edge of the blade 12, as clearly shown in Figure 4. The blade 11 is also provided with a stop 23 consisting of a wire having one end secured to the blade and further having a right angular extension 24 disposed immediately above and in contacting engagement with the strap of the gripping means 21, at all times.

Upon the outer side portion of the blade 12 there is formed an elongated abutment 25 extending longitudinally of the edge of the blade a suitable distance, lying flush with the edge of the blade as clearly shown in Figures 1 and 2. The blade 12 does not have a sharpened edge but cooperates with the cutting edge 26 of the blade 11. However, the blade 12 may include a sharpened edge if so desired.

The present shears are intended for use in gathering various crops having stems or stalks, such as grapes, cherries, apples and flowers of various kinds, only one hand being required to manipulate the shears to sever the stalk or stem and maintain a grip upon that portion of the stem caught between the abutment 25 and the flexible strap of the gripping means 21, the stem or stalk being so held until pressure upon the handles 13 and 14 is released. It should be noted that the stop 23 exerts a pressure upon the flexible strap in the direction of the abutment.

While I have shown and described a preferred form of the device, this is by way of illustration only, and I consider as my own, all such modifications in construction as fairly fall within the scope of the appended claim.

I claim:

In a crop gathering shears, a pair of pivotally connected crossed blades including handle members, a bow spring connected between the handle members normally holding said blades in open position to receive a stalk to be severed, one of said blades having an abutment on the outer side thereof, and extending at right angles to the blade, a bracket secured to the other blade positioned rearwardly of the pivot of the blades, said bracket having a lateral extension transversely across said handles, a spring strap mounted on said lateral extension of a length and width to overlie said abutment to grip the stalk interposed between said blades, simultaneously with the shearing of the stalk, and a stop means carried by said last named blade having a right angular extension disposed above said spring strap and in contacting engagement therewith to exert a pressure on said spring strap under closing movement of the handles.

References Cited in the file of this patent

UNITED STATES PATENTS

| | | |
|---|---|---|
| 460,903 | Woodward | Oct. 6, 1891 |
| 726,384 | Welch | Apr. 28, 1903 |
| 1,010,784 | Morse | Dec. 5, 1911 |
| 1,876,218 | Gee | Sept. 6, 1932 |
| 2,320,460 | Muller | June 1, 1943 |